R. B. PEARSON.
SELF OILING HANDSAW.
APPLICATION FILED FEB. 8, 1916.
1,191,821. Patented July 18, 1916.
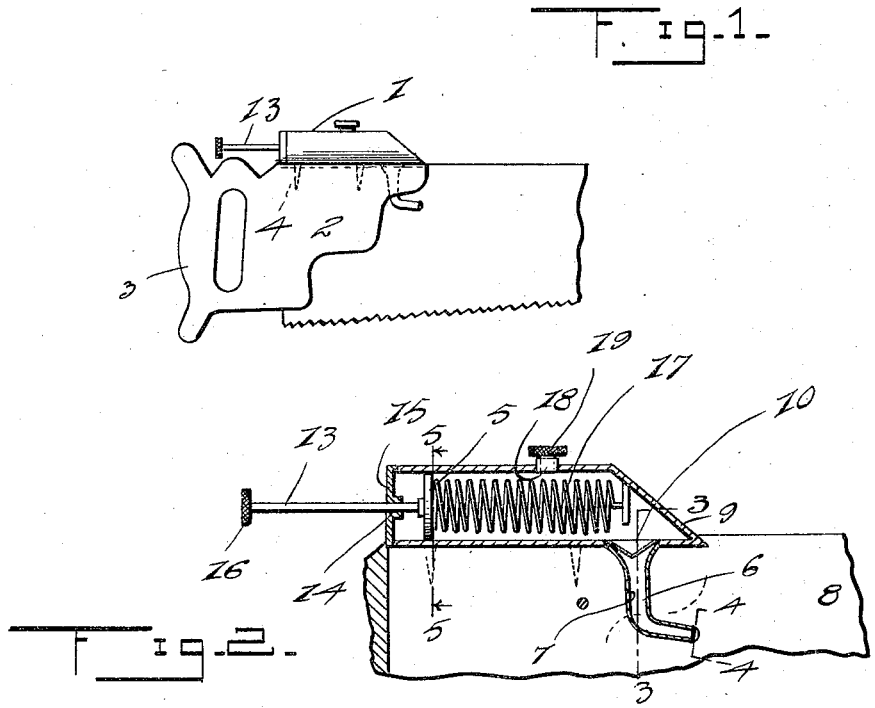
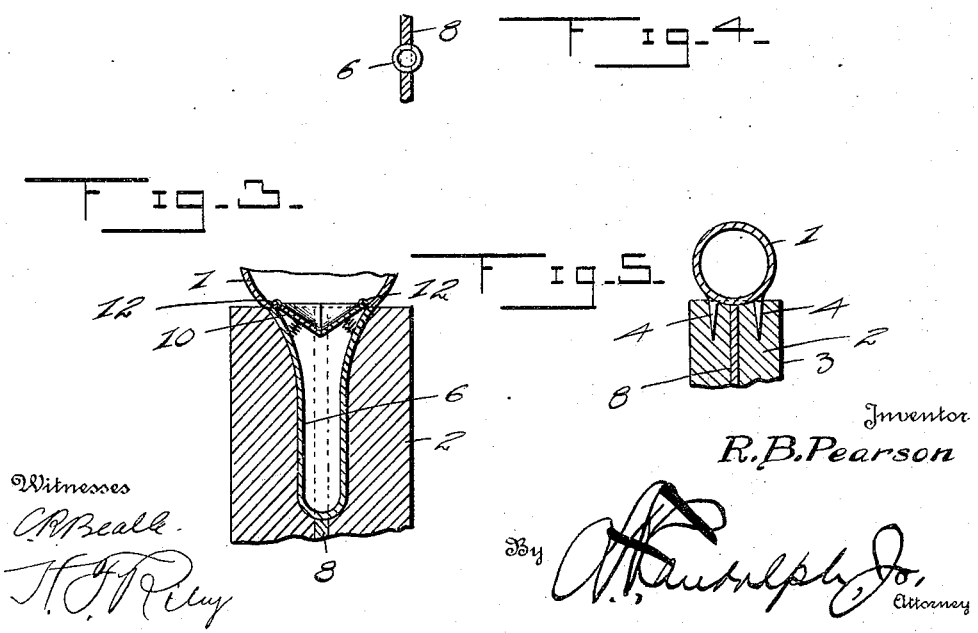
Inventor
R. B. Pearson

UNITED STATES PATENT OFFICE.

ROBERT BARTLEY PEARSON, OF GALVESTON, TEXAS.

SELF-OILING HANDSAW.

1,191,821.   Specification of Letters Patent.   Patented July 18, 1916.

Application filed February 8, 1916. Serial No. 77,065.

*To all whom it may concern:*

Be it known that I, ROBERT BARTLEY PEARSON, a citizen of the United States, residing at Galveston, in the county of Galveston and State of Texas, have invented certain new and useful Improvements in Self-Oiling Handsaws; and I do hereby declare the following to be a full, clear, and exact description of the invention, such as will enable others skilled in the art to which it appertains to make and use the same.

The invention relates to improvements in self-oiling handsaws.

The object of the present invention is to improve the construction of self-oiling handsaws and to provide a simple, practical and comparatively inexpensive device adapted to be readily applied to a handsaw and capable of convenient operation without removing the hand from the grip or handle of the handsaw and adapted when operated to lubricate both sides of the blade of the handsaw whereby an easy operation of the same is secured and considerable time saved which is usually lost in removing a hand saw from the kerf and oiling the saw.

With these and other objects in view the invention consists in the construction and novel combination and arrangement of parts hereinafter fully described, illustrated in the accompanying drawing and pointed out in the claim hereto appended, it being understood that various changes in the form, proportion and minor details of construction may be resorted to without departing from the spirit or sacrificing any of the advantages of the invention.

In the drawing Figure 1 is a side elevation of a portion of a hand saw provided with an attachment constructed in accordance with this invention, Fig. 2 is an enlarged longitudinal sectional view of the same, Fig. 3 is a vertical sectional view on the line 3—3 of Fig. 2, Fig. 4 is a similar view on the line 4—4 of Fig. 2, Fig. 5 is a transverse sectional view on the line 5—5 of Fig. 2.

Like numerals of reference designate corresponding parts in the several figures of the drawing.

In the accompanying drawing in which is illustrated the preferred embodiment of the invention, 1 designates a lubricator casing consisting of a cylinder extending longitudinally of the handle 2 of a handsaw and arranged at the upper edge of the said handle in rear of the grip 3 thereof. The cylindrical casing which is secured to the handle 2 by spurs 4 or other suitable fastening devices receives a plunger 5 and it is provided with an outlet from which extends a spout or nozzle 6. The spout or nozzle 6 which depends from the bottom of the front portion of the cylindrical casing is approximately L-shaped and it is located in an opening 7 in the blade 8 of the handsaw and its discharge end which is of greater diameter than the blade is adapted to lubricate both faces of the same as clearly illustrated in Fig. 4 of the drawings.

The front end of the casing is preferably tapered as shown, the front wall 9 being inclined downwardly and outwardly but any other configuration of lubricator casing may of course be employed. The casing 1 is provided at the outlet with an automatically closable valve composed of two substantially semi-conical sections 10 yieldably maintained in a closed position by suitable springs 11 and hingedly connected at their opposite edges 12 and adapted to swing downwardly to open the outlet when the plunger is forced inwardly by a rod 13. The rod extends through an opening 14 in the rear end wall or head 15 of the cylindrical casing 1 and is equipped at its outer end with a button or head 16 adapted to be operated by the thumb of the person using the saw without releasing his grasp on the grip portion 3 or removing the saw blade from the kerf. The plunger is yieldably urged rearwardly away from the inlet by a coiled spring 17. The coiled spring is located in advance of the plunger 5 and when the latter is forced inwardly or forwardly, the spring is compressed and the liquid lubricant is discharged from the casing and operates to open the check valve. As soon as the pressure on the operating rod 13 is released, the coiled spring will force the plunger 5 rearwardly relieving the check valve of pressure and creating a suction which is adapted to assist in closing the check valve. The cylindrical casing is provided at the top with a filling aperture 18 having a threaded closure 19 which is adapted to be readily removed to supply the casing 1 with lubricant.

What is claimed is:—

The combination with a saw having a blade provided with an opening, of a casing extending along the upper edge of the handle of the saw and provided with a spout extending into the opening and arranged to discharge a lubricant at opposite sides of the blade of the saw, an automatically closable check valve comprising two substantially semi-conical sections mounted at the said spout, a plunger located within the casing and having an operating rod extending to a point exteriorly of the casing and a spring for urging the plunger outwardly.

In testimony whereof I affix my signature in presence of two witnesses.

ROBERT BARTLEY PEARSON.

Witnesses:
 TIM SULLIVAN,
 D. CARANAGNOSTIS.

Copies of this patent may be obtained for five cents each, by addressing the "Commissioner of Patents, Washington, D. C."